US010152884B2

(12) United States Patent
Frederick et al.

(10) Patent No.: US 10,152,884 B2
(45) Date of Patent: Dec. 11, 2018

(54) SELECTIVE ACTIONS IN A VEHICLE BASED ON DETECTED AMBIENT HAZARD NOISES

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 14 days.

(21) Appl. No.: 15/483,091

(22) Filed: Apr. 10, 2017

(65) Prior Publication Data

US 2018/0293886 A1 Oct. 11, 2018

(51) Int. Cl.
*B60Q 9/00* (2006.01)
*G08G 1/0965* (2006.01)

(52) U.S. Cl.
CPC .................................. *G08G 1/0965* (2013.01)

(58) Field of Classification Search
CPC ............... G08G 1/0965; G08G 1/0962; G08G 1/096725; G08G 1/015; G08G 1/048; G08G 1/056; G08G 1/166; G01S 13/931; G01S 2013/9353; G01S 2013/9357
USPC .......................................................... 340/902
See application file for complete search history.

(56) References Cited

U.S. PATENT DOCUMENTS

| | | | | |
|---|---|---|---|---|
| 5,710,555 A | | 1/1998 | McConnell et al. | |
| 6,362,749 B1 | * | 3/2002 | Brill | G08G 1/0965 174/36 |
| 7,061,402 B1 | * | 6/2006 | Lawson | G08G 1/0965 340/901 |
| 7,741,962 B2 | | 6/2010 | Kalik | |
| 7,791,499 B2 | * | 9/2010 | Mohan | G08G 1/0962 340/384.4 |
| 8,138,946 B2 | * | 3/2012 | Villalobos | G08G 1/087 340/384.4 |
| 8,319,620 B2 | * | 11/2012 | Usher | G08G 1/0965 340/425.5 |
| 9,412,273 B2 | * | 8/2016 | Ricci | H04W 4/22 |
| 9,701,307 B1 | * | 7/2017 | Newman | B60W 30/09 |
| 2002/0022927 A1 | * | 2/2002 | Lemelson | G01S 19/11 701/301 |
| 2002/0150262 A1 | * | 10/2002 | Carter | G08G 1/0962 381/86 |
| 2007/0008175 A1 | * | 1/2007 | Johnson | G08G 1/0965 340/902 |

(Continued)

*Primary Examiner* — Ojiako K Nwugo
(74) *Attorney, Agent, or Firm* — Christopher G. Darrow; Darrow Mustafa PC

(57) ABSTRACT

Provided is a device and method for selective announcement of hazard-noise signals detected in ambient vehicle-noise environments are disclosed. The device and method provide for monitoring an ambient vehicle-noise environment for a hazard-noise signal. Upon detecting the hazard-noise signal, determining whether a source location of the hazard-noise signal closes on a monitoring location of the ambient vehicle-noise environment. When the source location of the hazard-noise signal closes on the monitoring location, generating announcement data relating to the hazard-noise signal, and transmitting the announcement data.

18 Claims, 5 Drawing Sheets

(56) References Cited

U.S. PATENT DOCUMENTS

| | | | | |
|---|---|---|---|---|
| 2009/0146799 | A1* | 6/2009 | Goldstein | B60Q 5/00<br>340/463 |
| 2010/0253539 | A1* | 10/2010 | Seder | G01S 13/723<br>340/903 |
| 2015/0228066 | A1* | 8/2015 | Farb | G06K 9/00805<br>348/148 |
| 2017/0096104 | A1* | 4/2017 | Kelly | B60Q 9/008 |
| 2017/0249839 | A1* | 8/2017 | Becker | G08G 1/096725 |

* cited by examiner vehicle control unit 200 memory 206 of vehicle control unit 200 ambient vehicle-noise environment 140

SELECTIVE ACTIONS IN A VEHICLE BASED ON DETECTED AMBIENT HAZARD NOISES

FIELD

The subject matter described herein relates in general to condition announcement relating to ambient vehicle-noise environments and, more particularly, to selective announcement of hazard-noise signals detected in ambient vehicle-noise environments.

BACKGROUND

Generally, vehicles have been trending towards quieter cabin spaces for the customer. With this trend of isolation from outside conditions, a vehicle operator and/or passenger may not be aware of sirens relating to emergency vehicles or noises indicating traffic situations ahead. Also, because these sounds may be generally instantaneous and indicate a need to yield to emergency vehicles or to address adverse conditions ahead, the vehicle operator will have a need for time to mentally and physically react. There is a need for sensing ambient vehicle-noise conditions for sounds associated with hazards, and to selectively provide an announcement of such sounds so that a vehicle operator, or a vehicle under autonomous operation, may respond accordingly.

SUMMARY

A device and method for selective announcement of hazard-noise signals detected in ambient vehicle-noise environments are disclosed.

In one implementation, a method is disclosed. The method includes monitoring an ambient vehicle-noise environment for a hazard-noise signal. Upon detecting the hazard-noise signal, determining whether a source location of the hazard-noise signal closes on a monitoring location of the ambient vehicle-noise environment. When the source location of the hazard-noise signal closes on the monitoring location, generating announcement data relating to the hazard-noise signal, and transmitting the announcement data.

In another implementation, a vehicle control unit is disclosed. The vehicle control unit includes a wireless communication interface to service communication with a vehicle network, a processor communicably coupled to the wireless communication interface, and memory communicably coupled to the processor. The memory stores an ambient vehicle-noise environment module, a source location tracking module, and an announcement module. The ambient vehicle-noise environment module includes instructions that, when executed by the processor, cause the processor to monitor an ambient vehicle-noise environment for at least one of a plurality of hazard-noise signals, and upon detecting the at least one the hazard-noise signal, generate a hazard-noise detection signal. The source location tracking module includes instructions that, when executed by the processor, cause the processor to determine a dynamic closing relation of a source location of the at least one hazard-noise signal relative to a monitoring location of the ambient vehicle-noise environment, generate, based on the dynamic closing relation, closing data operable to indicate the dynamic closing relation. The announcement module includes instructions that, when executed by the processor, cause the processor to, when the closing data indicates the source location closes on the monitoring location, generate announcement data relating to the at least one hazard-noise signal, and transmitting the announcement data.

BRIEF DESCRIPTION OF THE DRAWINGS

The description makes reference to the accompanying drawings wherein like reference numerals refer to like parts throughout the several views, and wherein.

DETAILED DESCRIPTION

A device and method for monitoring and selective announcement of hazard-noise signals in an ambient vehicle-noise environment are disclosed. Moreover, the device and method may operate to determine whether a source location of the hazard-noise is closing on the monitoring location (such as the location of the vehicle), prompting vehicle operator and/or autonomous action in responses.

Generally, a consideration in vehicle design is the vehicle passenger's experience, and considering technologies and designs to improve those experiences. For example, a vehicle passenger's travel experience may be enhanced by media playback audio systems, seat ergonomics, comfort features (such as heated and/or cooled seats), etc. An aspect of improving the passenger experience by providing a sense of separation from the stresses from the outside world. An aspect of this sense of separation suppression of sounds from the ambient vehicle-noise environment.

As may be appreciated, however, is that the greater the degree of separation from the ambient vehicle-noise environment, the greater the need to monitor the environment for conditions for selectively calling on a vehicle occupant's attention, or to assume manual control from an autonomous handover. Such conditions may include hazard-noise signals that may otherwise go unnoticed, such as emergency vehicle sirens, collision sounds, extended vehicle horn soundings, warning shouts, etc.

Figure 1:
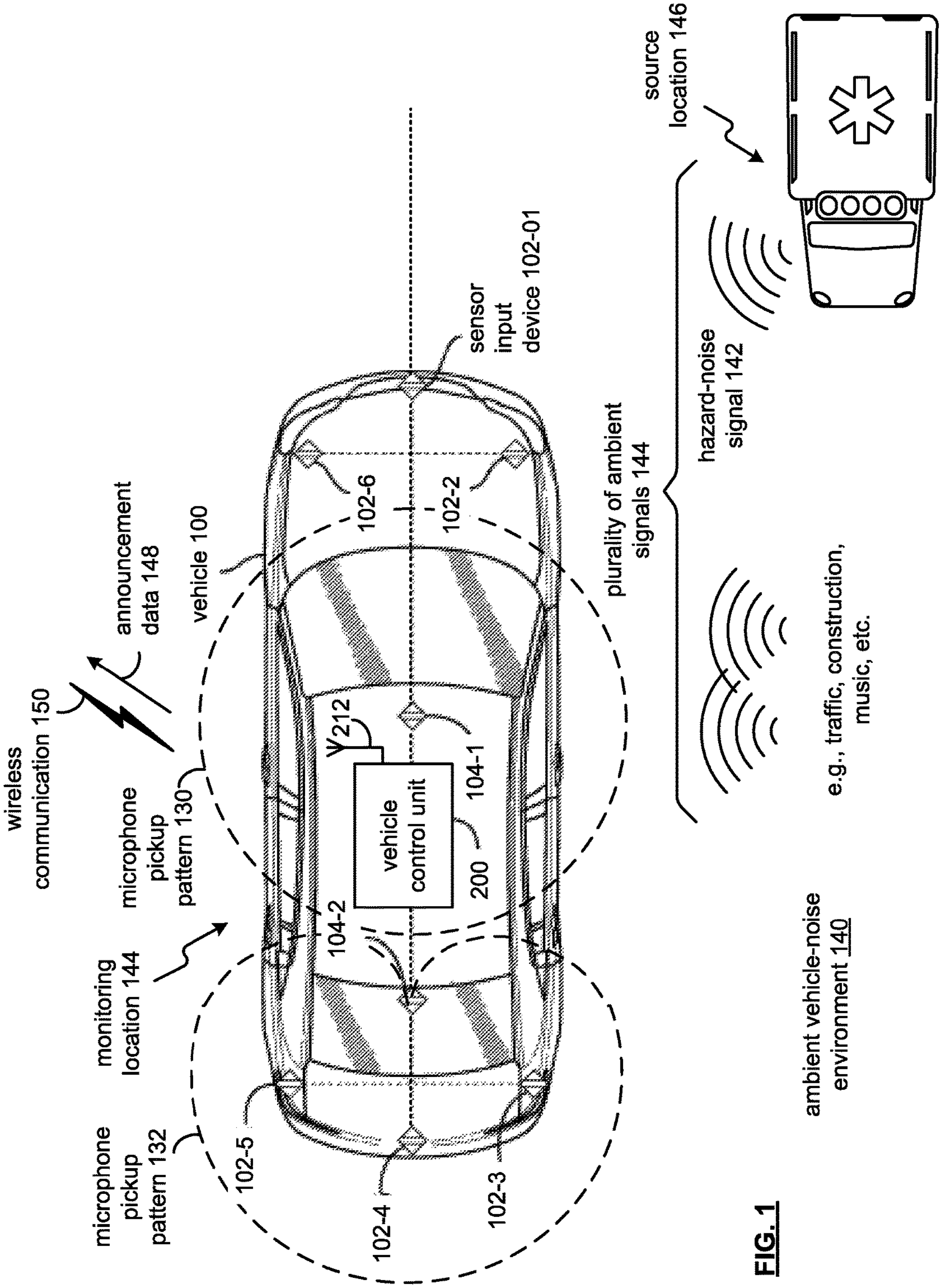
FIG. 1 is a schematic illustration of a vehicle including a vehicle control unit.

FIG. 1 is a schematic illustration of a vehicle 100 including a vehicle control unit 200. A plurality of sensor devices 102 and 104 are in communication with the control unit 200. The plurality of sensor devices 102 and 104 can be positioned on the outer surface of the vehicle 100, or may be positioned in a concealed fashion for aesthetic purposes with regard to the vehicle. Moreover, the sensor devices may operate at frequencies in which the vehicle body or portions thereof appear transparent to the respective sensor device.

Communication between the sensor devices may be on a bus basis, and may also be used or operated by other systems of the vehicle 100. For example, the sensor devices 102 and 104 may be coupled by a combination of network architectures such as a Body Electronic Area Network (BEAN), a Controller Area Network (CAN) bus configuration, an Audio Visual Communication-Local Area Network (AVC-LAN) configuration, an automotive Ethernet LAN and/or automotive Wireless LAN configuration, and/or other combinations of additional communication-system architectures to provide communications between devices and systems of the vehicle 100.

The sensor devices 102 and 104 may operate to monitor ambient conditions relating to the vehicle 100, including audio, visual, and tactile changes to the vehicle environment. The sensor devices include sensor input devices 102 and audible sensor devices 104.

The sensor input devices 102 (that is, sensor input devices 102-1, 102-2, 102-3, 102-4, 102-5, and 102-6) provide tactile or relational changes in the ambient conditions of the vehicle, such as an person, object, vehicle(s), etc. The one or more of the sensor input devices 102 can be configured to capture changes in velocity, acceleration, and/or distance to these objects in the ambient conditions of the vehicle 100.

The sensor input devices 102 may be provided by a Light Detection and Ranging (LIDAR) system, in which the sensor input devices 102 may capture data related to laser light returns from physical objects in the environment of the vehicle 100. Because light moves at a constant speed, LIDAR may be used to determine a distance between the sensor input device 102 and another object with a high degree of accuracy. Also, measurements take into consideration movement of the sensor input device 102 (such as sensor height, location and orientation). Also, GPS location may be used for each of the sensor input devices 102 for determining sensor movement. The sensor input devices 102 may also include a combination of lasers (LIDAR) and milliwave radar devices.

The audible sensor devices 104-1 and 104-2 provide audible sensing of the ambient vehicle-noise environment 140 of the vehicle 100 for a hazard-noise signal 142 of a plurality of ambient signals 144. Examples of hazard-noise signals may include an emergency vehicle siren signal, a vehicle horn warning signal, a signal indicative of a collision impact, etc. Monitoring of the ambient vehicle-noise environment may be provided by receiving a plurality of ambient signals by a microphone pickup pattern of an audible sensor device to produce a plurality of received signal data.

The microphone pickup patterns 130 and 132 may be omnidirectional, bidirectional, cartoid, shotgun, etc. Each audible sensor device 104-1 and 104-2 (FIG. 1) may have similar pickup patterns, or dissimilar patterns. For example, directional patterns may be used to determine which of an audible sensor device 104-1 and 104-2 are proximal to the hazard-noise signal. In FIG. 1, audible sensor device 104-1 may have an omnidirectional microphone pickup pattern 130, and audible sensor device 104-2 may have a cartoid microphone pickup pattern 132, which in operation is a "rearward" sensing pickup pattern.

The plurality of received signal data by the audible sensor devices 104-1 and 104-2, alone or in combination, may be filtered using a characteristic filter parameter related to the hazard-noise signal 142 generated by the source location 146. The filtered signal data produces filtered signal data, which when includes a hazard-noise signal of several hazard-noise signals, detection of the hazard-noise signal 142 may be indicated. Upon detecting the hazard-noise signal 142, a determination is made as to whether a source location 146 of the hazard-noise signal 142 closes on a monitoring location 144 of the ambient vehicle-noise environment 140, as is discussed in detail with reference to FIGS. 2-5.

The audible sensor devices 104-1 and 104-2 may be provided, for example, by a nano-electromechanical system (NEMS) or micro-electromechanical system (MEMS) audio sensor omnidirectional digital microphone, a sound-triggered digital microphone, etc.

For controlling data input from the sensor devices 102 and 104, the respective sensitivity and focus of each of the sensor devices may be dynamically adjusted to limit data acquisition based upon speed, terrain, activity around the vehicle, etc.

The vehicle 100 can also include options for operating in manual mode, autonomous mode, and/or driver-assist mode. When the vehicle 100 is in manual mode, the driver manually controls the vehicle systems, which may include a propulsion system, a steering system, a stability control system, a navigation system, an energy system, and any other systems that can control various vehicle functions (such as the vehicle climate or entertainment functions, etc.). The vehicle 100 can also include interfaces for the driver to interact with the vehicle systems, for example, one or more interactive displays, audio systems, voice recognition systems, buttons and/or dials, haptic feedback systems, or any other means for inputting or outputting information.

In autonomous mode of operation, a computing device, which may be provided by the vehicle control unit 200, or in combination therewith, can be used to control one or more of the vehicle systems without the vehicle user's direct intervention. Some vehicles may also be equipped with a "driver-assist mode," in which operation of the vehicle 100 can be shared between the vehicle user and a computing device.

For example, the vehicle user can control certain aspects of the vehicle operation, such as steering, while the computing device can control other aspects of the vehicle operation, such as braking and acceleration. When the vehicle 100 is operating in autonomous (or driver-assist) mode, the computing device issues commands to the various vehicle systems to direct their operation, rather than such vehicle systems being controlled by the vehicle user.

As shown in FIG. 1, the vehicle control unit 200 is configured to provide wireless communication 150 with a handheld mobile user device through the antenna 212, other vehicles (vehicle-to-vehicle), and/or infrastructure (vehicle-to-infrastructure), which is discussed in detail with respect to FIGS. 2-5. In the example of FIG. 1, announcement data 148 that may relate to the hazard-noise signal 142 may be transmitted via the wireless communication 150.

Figure 2:
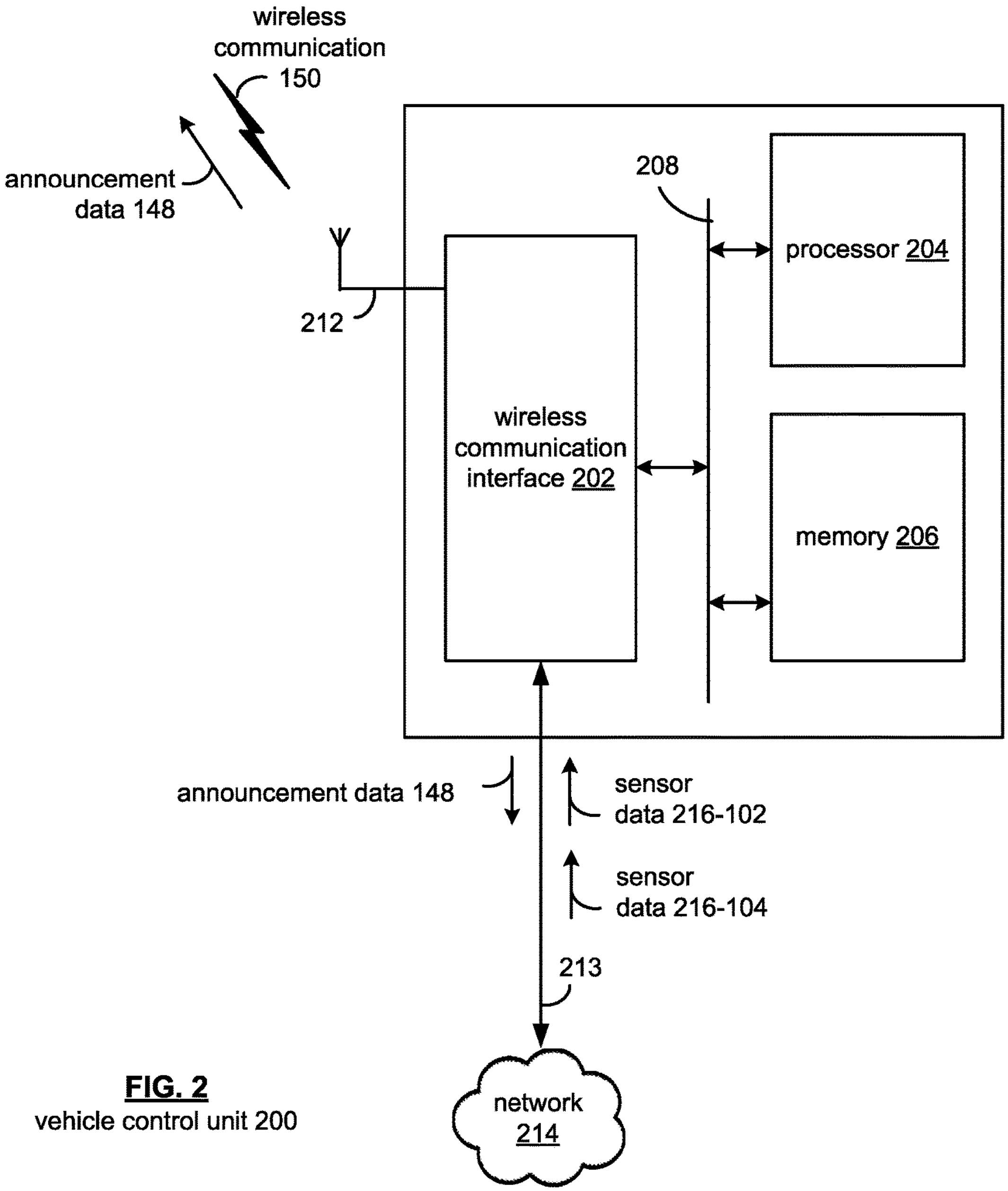
FIG. 2 illustrates a block diagram of the vehicle control unit of FIG. 1.

FIG. 2 illustrates a block diagram of a vehicle control unit 200, which includes a wireless communication interface 202, a processor 204, and memory 206, that are communicatively coupled via a bus 208.

The processor 204 of the vehicle control unit 200 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information. The memory 206 can be capable of storing machine readable instructions such that the machine readable instructions can be accessed by the processor 204.

The machine readable instructions can comprise logic or algorithm(s) written in programming languages, and generations thereof, (e.g., 1GL, 2GL, 3GL, 4GL, or 5GL) such as, for example, machine language that may be directly executed by the processor 204, or assembly language, object-oriented programming (OOP), scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 204 executes, hard coded and/or operational instructions corresponding to at least some of the steps and/or functions illustrated in FIGS. 1-5 to perform the selective ambient hazard-noise signal announcement described herein.

The wireless communication interface 202 generally governs and manages the vehicle user input data via the vehicle network 214 over the communication path 213 and/or wireless communication 150. The wireless communication interface 202 also manages controller unit output data such as the announcement data 148, input data such as sensor data 216. There is no restriction on the present disclosure operating on any particular hardware arrangement and therefore the basic features herein may be substituted, removed, added to, or otherwise modified for improved hardware and/or firmware arrangements as they may develop.

The sensor data 216 includes capturing of intensity or reflectivity returns of the ambient vehicle-noise environment surrounding the vehicle, and relative distance source locations of hazard-noise signals. In general, data captured by the sensors 102 (such as sensor data 216-102) and 104 (such as sensor data 216-104) and provided to the vehicle control unit 200 via the communication path 213 can be used by one or more of applications of the vehicle to determine the environment surroundings of the vehicle, and to also sense improved positional accuracy with vehicle distances.

Figure 3:
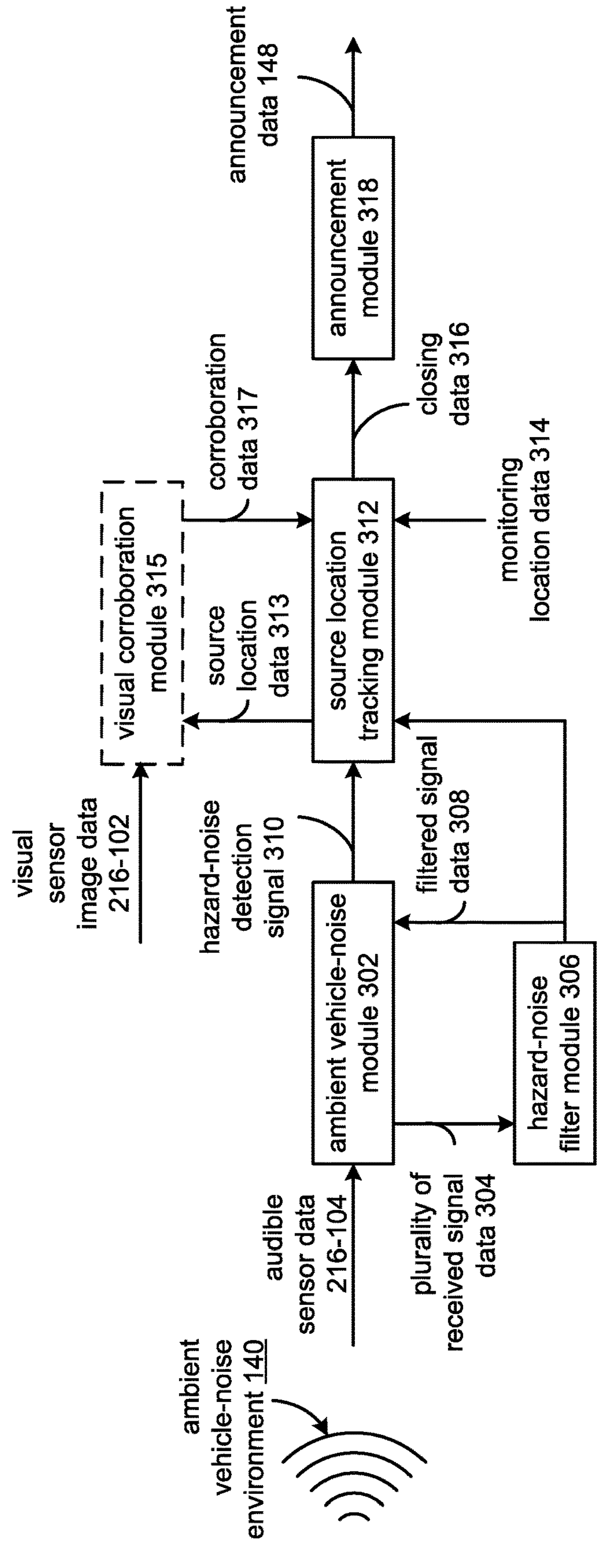
FIG. 3 illustrates a functional module block diagram stored in a memory for the vehicle control unit of FIGS. 1 and 2 for monitoring and selective announcement of hazard-noise signals in an ambient vehicle-noise environment.

FIG. 3 illustrates a functional module block diagram stored in a memory 206 for vehicle control unit 200, where memory 206 stores an ambient vehicle-noise module 302, a source location tracking module 312, and an announcement data module 318. The ambient vehicle-noise module 302 may operate in cooperation with the hazard-noise filter module 306, and visual corroboration module 305.

The ambient vehicle-noise module 302 includes instructions that, when executed by the processor 204, cause the processor 204 to monitor an ambient vehicle-noise environment 140 for at least one of a plurality of hazard-noise signals via a plurality of ambient signals 141. Upon detecting the at least one hazard-noise signal, the ambient vehicle-noise module 302 generates a hazard-noise detection signal 310. As may be appreciated, the hazard-noise detection signal may include null data when at least one hazard-noise signal is not detected, while a value identifying a type of the at least one hazard-noise signal may populate the hazard-noise detection signal 310.

One or many hazard-noise signals may be present generally in the ambient-noise environment 140. Examples may include a fire engine siren, an ambulance siren, a police vehicle siren, collision sounds, shouts from pedestrians and/or other vehicle drivers and passengers, etc.

As may be appreciated the ambient vehicle-noise module 302 may provide a plurality of received signal data 304 to hazard-noise filter module 306 via the sensor data 216-104 produced by audible sensor device 104 (see FIG. 1). As may be appreciated, the audible sensor device may be operable to convert the analog signals to digital data representations (such as via an analog-to-digital converter) 216-104.

Also, the audible sensor device 104 and/or the ambient vehicle-noise module 302 may include analog and/or digital pre-filters to remove frequencies not likely to include hazard-noise signals, such as background noise, white noise, vehicle component noise, and/or frequencies outside hazard-noise signal spectrum(s).

The hazard-noise filter module 306 may include a plurality of digital filters, such as a bank of fast Fourier transform (FFT) filters, to process the plurality of received signal data 304. As may be appreciated, a filter bank may include an array of band-pass filters, each one carrying a single frequency sub-band of the plurality of ambient signals 141 represented by the plurality of received signal data 304. Each frequency may relate to one of the plurality of hazard-noise signals.

The hazard-noise filter module 306 produces filtered signal data 308. From the filtered signal data 308, the ambient vehicle-noise module 302 may operate to detect the at least one hazard-noise signal of the plurality of hazard-noise signals, and produce hazard-noise detection signal 310. The hazard-noise detection signal 310 may operate to indicate the presence of at least one hazard-noise signal in the ambient vehicle-noise environment 140, and the category (a vehicle siren, a shout. a collision impact, etc.).

The source location tracking module 312 includes instructions, that when executed by the processor 204, cause the processor 204 to determine a dynamic closing relation of a source location of the at least one hazard-noise signal relative to a monitoring location of the ambient vehicle-noise environment 140.

In operation, the source location tracking module 312 may determine a source location of the at least one hazard-noise signal via filtered signal data 308 generated by the hazard-noise filter module 306, as well as via the audible sensor data 216-104.

The source location tracking module 312 also receives monitoring location data 314, which in the example of FIG. 3, may be the vehicle 100. The monitoring location data 314 may be provided via an inertial measurement unit (IMU) sensor device, global positioning satellite (GPS) data, and/or a combination thereof.

The source location may be updated at predetermined intervals (or sample periods) from the filtered signal data 308 and/or the audible sensor data 216-104 to generate a vector of the location source relative to the monitoring location provided by the monitoring location data 314. Generally, a vector having a magnitude (that is speed) in a direction relative to the monitoring location indicates a dynamic closing relation of the source location of the at least one hazard-noise signal relative to the monitoring location data 314.

When the vehicle 100 (FIG. 1) is in an autonomous operation, visual corroboration module 315 may generate corroboration data 317 relating to the source location data 313. As may be appreciated, a vehicle 100 that has vehicle operator and/or passenger, visual inspection of the environment may be provided by the vehicle operator, and to react accordingly. In the context of autonomous operation in which the vehicle 100 continues autonomous operation, or an autonomous handover occurs to place control with the vehicle operator, visual corroboration may be provided via visual sensor data 216-102.

With the example of FIG. 3, the visual corroboration module 315 includes instructions that, when executed by the processor 204, cause the processor 204 to sense the source location of the at least one hazard-noise signal with an image sensor device. The visual corroboration module 315 is illustrated in phantom lines to reflect the optional function it provides to mimic a human's visual assessment of the environment.

In operation, the visual corroboration module 315 may sense the source location based on visual sensor image data 216-102 of the image sensor device(s). The visual sensor data 216-102, which is image data, may be compared with a plurality of reference images generally associated with the at least one hazard-noise signal. When the image data of the visual sensor data 216-102 compares favorably with one of the plurality of reference images, the visual corroboration module 315 generates corroboration data 317 based on the corroborating the source location data 313 of the hazard-noise signal via the image sensor device.

The source location tracking module 312, with filtered signal data 308, hazard-noise detection signal 310, and corroboration data 317, when used, generates closing data 316 relative to monitoring location data 314. The closing data 316 may include data values indicative of whether the source location of the hazard-noise signal closes on the monitoring location. As may be appreciated, the closing data 316 may convey that a vehicle may be closing on the monitoring location (such as a vehicle), or may be determined to not be closing on the monitoring location. Also, the value of the closing data 316 may indicate degrees of urgency (such as a fast approach of an emergency vehicle), or may indicate degrees of non-urgency (such as an emergency vehicle not closing on the vehicle, or traveling in an opposite direction).

Announcement module 318 receives the closing data 316, and based on the closing data 316, generates announcement data 148. The announcement data 148 may be transmitted to provide a vehicle user information relating to the hazard-noise source, such as a visually announcing the announcement data 148 via a vehicle display (for example, a head unit display, a heads-up display, an in-dash display, etc.), or audibly announcing the announcement data 148 via a vehicle audio device (such as the vehicle music system speakers, vehicle warning chimes, conveying the exterior hazard-noise signal to the vehicle cabin, etc.). Moreover, the announcement data 148 may be transmitted via a wireless communication 226, to be received via a handheld mobile device of the vehicle operator and/or passenger(s).

In the context of a vehicle that may be under an autonomous operation mode, the announcement data 148 may initiate a control handover protocol of vehicle control to a vehicle operator. That is, for example, the announcement data 148 may be visually and/or audibly announced to the vehicle operator with a further announcement of vehicle control, including vehicle powertrain control (such as speed, braking, etc.), is being returned to the vehicle operator (with sufficient control buffers to confirm engagement by the vehicle operator). On the other hand, when the vehicle may be capable of continuing autonomous vehicle operation(s), such as due to suitable control algorithms and environment assessment, the announcement data 148 may be transmitted to a powertrain control unit (not shown), which may function to control the vehicle responsive to the hazard-noise signal as needed (such as slowing and pulling the vehicle to the side of the road to yield to an emergency vehicle via a traffic lane change command, slowing in view of collision on the travel path ahead, etc.).

As noted, when the closing data 316 indicates a hazard-noise signal closes on the monitoring location, the announcement data 148 operates to prompt a vehicle user action, which may include pulling over to the side of the road when the hazard-noise signal relates to an emergency vehicle and/or a control handover from an autonomous operation mode to a manual driving mode to pull over to the side of the road, slowing when the hazard-noise signal relates to a collision ahead, etc. On the other hand, when the closing data 316 indicates a hazard-noise signal is not closing on the monitoring location, the announcement data 148 may operate to provide information to the vehicle operator.

Figure 4:
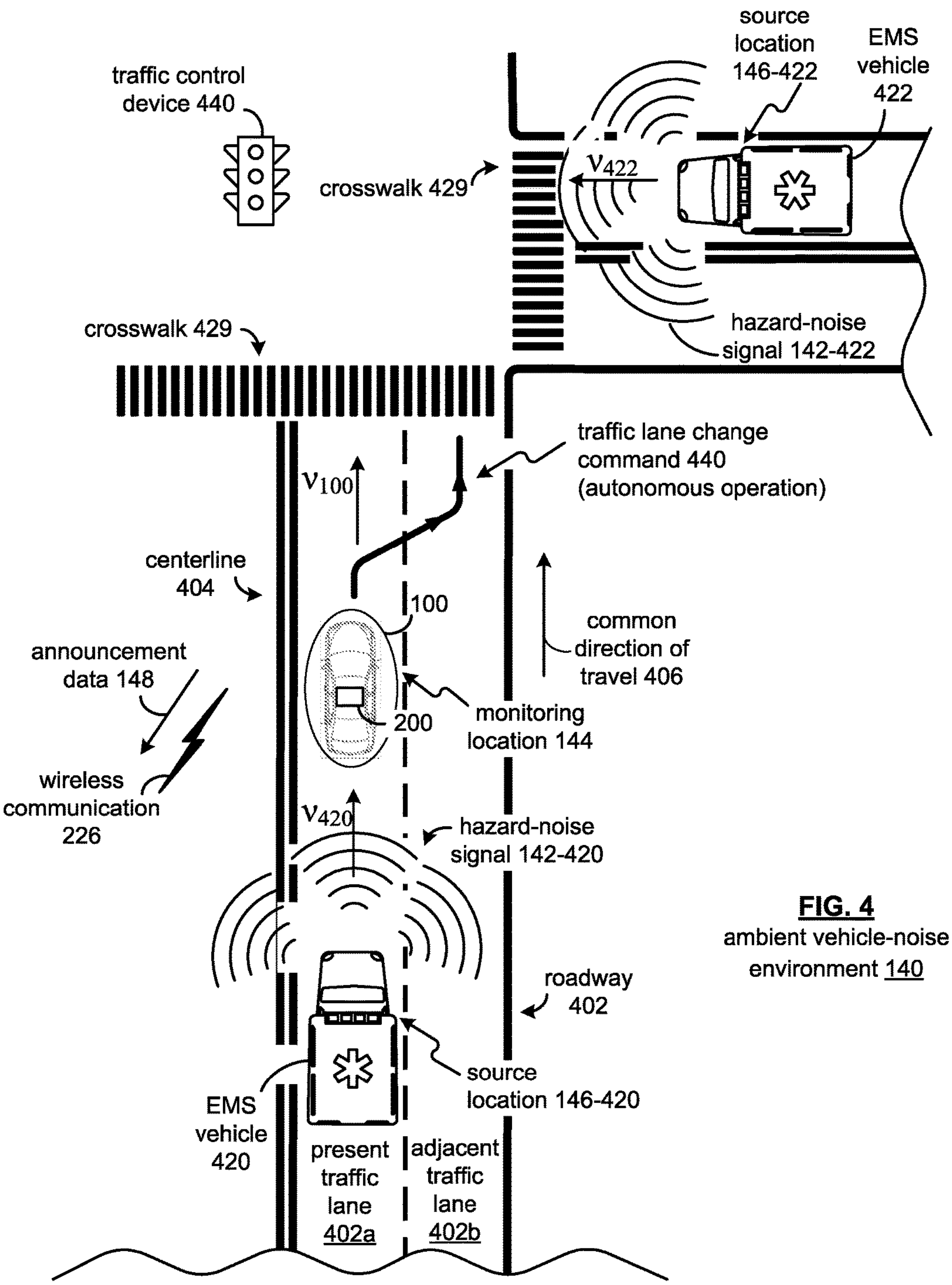
FIG. 4 illustrates an example ambient vehicle-noise environment of the vehicle.

FIG. 4 illustrates an example ambient vehicle-noise environment 140 of the vehicle 100 traveling a roadway 144. The roadway 402 may include a centerline 404, and an intersection that may be defined by crosswalks 429, and a traffic control device 440.

In operation, the vehicle 100, which includes vehicle control unit 200, may operate to monitoring the ambient vehicle-noise environment 140 for a hazard-noise signal. Upon detecting the hazard-noise signal 142-420 of the EMS vehicle 420, the vehicle control unit 200 may operate to determine whether the source location 146-420 of the hazard-noise signal 142-420 closes on the monitoring location 144. As may be appreciated, the monitoring location 144 of the example coincides with the location of the vehicle 100. Other monitoring locations 144 may also be available, such as infrastructures including the traffic control device 440. Infrastructure devices, in turn, may convey closing information to the vehicle 100 using vehicle-to-infrastructure communications via wireless communication 226.

As shown, vehicle 100 has a velocity of $V_{100}$. The EMS vehicle 420 has a velocity of $V_{420}$, both traveling in a common direction of travel 406. Because emergency response includes a sense of urgency, the likelihood is that the velocity $V_{420}$ is greater than velocity $V_{100}$.

As may be appreciated, an source location may close on a monitoring location on an intercept basis, such as with EMS vehicle 422, for example. The source location 146-422 of the hazard-noise signal 142-422 operates to intercept, that is closes, the monitoring location 144 of the vehicle 100. As another example, when a collision ahead of the vehicle 100 occurs, by operation, that source location of the hazard-noise signal closes on the monitoring location 144, because the common direction of travel 406 of the vehicle comes closer, or closes, on the example hazard-noise signal provided by the traffic collision.

Referring back to EMS vehicle 420, the source location 146-420 of the hazard-noise signal 142-420 closes on the monitoring location 144. In this respect, the vehicle control unit 200 may operate to generate announcement data 148 relating to the hazard-noise signal 142-420, and may transmit the announcement data 148. The announcement data 148 may be visually and/or audibly transmitted to a vehicle operator through vehicle display and audio devices, may be wirelessly transmitted to a handheld mobile device of the operator for audible, visual and/or haptic announcement relating to the hazard-noise signal 142-420, etc.

Responsive to the announcement data 148, the vehicle operator may pull over from the present traffic lane 402*a*, to an adjacent traffic lane 402*b* to yield to the EMS vehicle 420. In the alternative, when the vehicle 100 operates in an autonomous operation mode, the announcement data 148 may operate to prompt a control handover to a vehicle operator, or may prompt a traffic lane change command 440, which may be generated via a vehicle powertrain unit (not shown) of the vehicle 100 in response to the announcement data 148.

Figure 5:
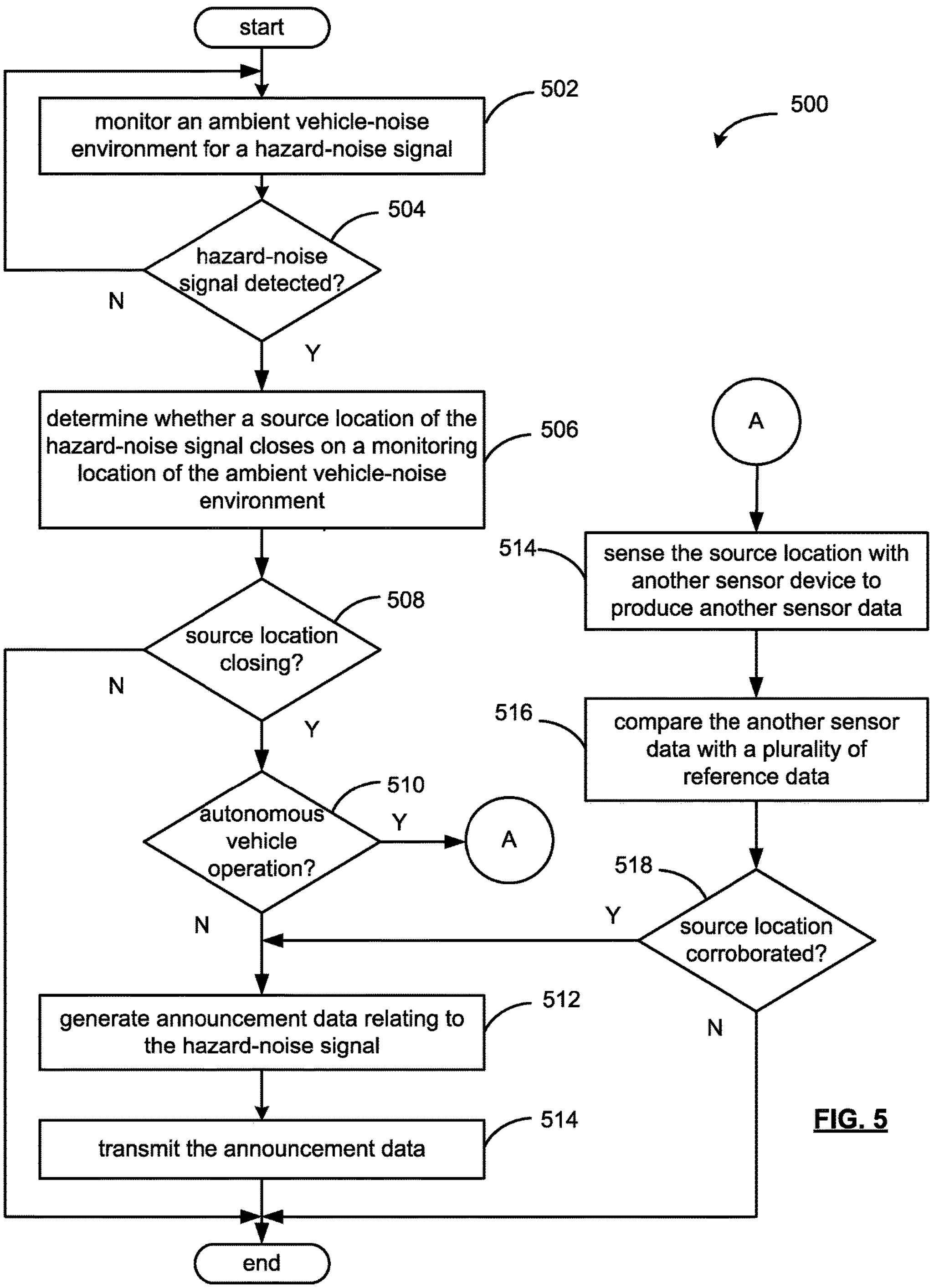
FIG. 5 shows an example process for automated driving using geographic feature-based localization.

FIG. 5 shows an example process 500 for selective announcement of hazard-noise signals detected in ambient vehicle-noise environments.

At operation 502, an ambient vehicle-noise environment may be monitored for a hazard-noise signal. Examples of hazard-noise signals may include an emergency vehicle siren signal, a vehicle horn warning signal, a signal indicative of a collision impact, etc. Monitoring of the ambient vehicle-noise environment may be provided by receiving a plurality of ambient signals by a microphone pickup pattern of an audible sensor device to produce a plurality of received signal data.

The microphone pickup patterns may be omnidirectional, bidirectional, cartoid, shotgun, etc. Each audible sensor device 104-1 and 104-2 (FIG. 1) may have similar pickup patterns, or dissimilar patterns. For example, directional patterns may be used to determine which of an audible sensor device 104-1 and 104-2 are proximal to the hazard-noise signal.

The plurality of received signal data may be filtered using a characteristic filter parameter related to the hazard-noise signal to produce filtered signal data, when the filtered signal data includes the hazard-noise signal, detection of the hazard-noise signal may be indicated.

Upon detecting the hazard-noise signal at operation 504, a determination is made at operation 506 as to whether a source location of the hazard-noise signal closes on a monitoring location of the ambient vehicle-noise environment.

When at operation 508 the source location of the hazard-noise signal closes on the monitoring location, announcement data relating to the hazard-noise signal may be generated at operation 512, and the announcement data transmitted at operation 514. The announcement data may be transmitted, for example, to a vehicle operator by visually announcing the announcement data via a vehicle display, audibly announcing the announcement data via a vehicle audio device, by haptic feedback via vehicle control surfaces, via the vehicle operator mobile handheld device, or combinations thereof.

In the event that an autonomous vehicle operation is underway at operation 510, the source location of the hazard-noise signal may be corroborated beginning at operation 514. At operation 514, the source location may be sensed with another sensor device of the vehicle to produce another sensor data. At operation 516, the another sensor data may be compared with a plurality of reference data. When the another sensor data compares favorably with one of the plurality of reference data, at operation 518, the source location of the hazard-noise signal is corroborated, and may proceed to operation 512. Otherwise, process 500 ends.

As may be appreciated, the another sensor device may include at least one of a light detection and ranging (LiDAR) sensor device, a radar sensor device, and a visual sensor device. Other such environment sensor devices may be polled to corroborate the hazard-noise signal sensed via audible sensor devices 104-1 and 104-2 (FIG. 1).

As noted, announcement data relating to the hazard-noise signal may be generated at operation 512, and the announcement data transmitted at operation 514. The transmitting the announcement data may, when the vehicle operates under the autonomous vehicle operation, initiating a handover sequence from the autonomous vehicle operation to a manual vehicle operation. Also, when the vehicle operates under the autonomous vehicle operation, the transmitting the announcement data may be provided for receipt by a powertrain control unit of a vehicle being operable to render powertrain control data for an autonomous response to the announcement data, such as acting on a change lane command to yield to an emergency vehicle that is closing on the monitoring location (that is, vehicle 100 of FIG. 1, for example).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

As one of ordinary skill in the art may appreciate, the term "substantially" or "approximately," as may be used herein, provides an industry-accepted tolerance to its corresponding term and/or relativity between items.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage medium, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising:

monitoring, using one or more audible sensors of a vehicle, an environment of the vehicle;

identifying, using first data acquired by the one or more audible sensors, a hazard-noise signal indicative of a hazard noise being detected in the environment;

upon identifying the hazard-noise signal, performing the following:

determining a first relative location associated with a source of the hazard noise;

determining, using second data acquired subsequent to the first data by at least one of the one or more audible sensors, a second relative location;

sensing the location of the source with another sensor to produce additional sensor data;

comparing the additional sensor data with the data corresponding to any one of the first relative location and the second relative location of the source; and when the additional sensor data compares favorably with the data, corroborate the first relative location or the second relative location of the source;

in response to the first relative location and second relative location being corroborated, determining, using the first relative location and second relative location, a vector having a magnitude and direction relative to the location of the vehicle; and determining, using the identified vector, whether a location of the source of the hazard noise closes on a location of the vehicle; and when the location of the source of the hazard noise closes on the location of the vehicle, performing the following:

generating, via one or more processors of the vehicle, announcement data relating to the hazard-noise signal; and transmitting, via the one or more processors of the vehicle, the announcement data.

2. The method of claim 1, wherein the monitoring the environment of the vehicle further comprises:

acquiring a plurality of ambient signals by the one or more audible sensors of the vehicle to produce a plurality of received signal data; and filtering the plurality of received signal data using a characteristic filter parameter related to the hazard-noise signal to produce filtered signal data.

3. The method of claim 1, wherein the vehicle is capable of an autonomous vehicle operation.

4. The method of claim 3, further comprising:

when the vehicle operates under the autonomous vehicle operation and the source of the hazard noise closes on the location of the vehicle, initiating a handover sequence from the autonomous vehicle operation to a manual vehicle operation.

5. The method of claim 3, wherein the transmitting the announcement data further comprises:

when the vehicle operates under the autonomous vehicle operation, transmitting data for receipt by a powertrain control unit being operable to render powertrain control data for an autonomous response to the data, the autonomous response being any one of a lane change or pulling the vehicle to a side of a road upon which the vehicle is operating.

6. The method of claim 1, wherein the another sensor comprises at least one of:

a light detection and ranging (LiDAR) sensor;

radar sensor; and visual sensor.

7. The method of claim 1, wherein the hazard-noise signal comprises at least one of:

an emergency vehicle siren signal;

a vehicle horn warning signal; and an audio signal indicative of a collision impact.

8. The method of claim 1, wherein the transmitting the announcement data further comprises at least one of:

visually announcing the announcement data via a vehicle display; and audibly announcing the announcement data via a vehicle audio device.

9. The method of claim 1, wherein transmitting the announcement data comprises:

audibly conveying the exterior hazard-noise signal to the vehicle cabin via the vehicle audio device.

10. A method comprising:

monitoring, via data obtained by one or more audible sensors of a vehicle capable of an autonomous vehicle operation, an environment of the vehicle to identify at least one hazard-noise signal indicative of a hazard noise being detected in the environment of the vehicle;

upon identifying the at least one hazard-noise signal, performing the following:

determining a location of a source of the hazard noise relative to a location of the vehicle;

determining whether the location of the source of the hazard noise closes on the location of the vehicle by:

sensing the location of the source with another sensor to produce additional data;

comparing the additional data with a plurality of reference data; and when the additional data compares favorably with one of the plurality of reference data, generating corroboration data for corroborating the location of the source via the another sensor; and in response to the location of the source being corroborated and when the location of the source of the hazard noise closes on the location of the vehicle, performing the following:

determining one or more maneuvers to execute including at least one of executing a lane change and pulling over the vehicle; and controlling one or more vehicle components to execute the one or more maneuvers, whereby, in executing the one or more maneuvers, the vehicle yields to the source of the hazard noise.

11. The method of claim 10, wherein the monitoring the environment of the vehicle further comprises:

generating a plurality of ambient signals by one or more audible sensors of the vehicle to produce a plurality of received signal data;

filtering the plurality of received signal data with a plurality of characteristic filter parameters, each of the plurality of characteristic filter parameters relating to each of a plurality of hazard-noise signals including the at least one hazard-noise signal to produce filtered signal data; and when the filtered signal data includes the at least one hazard-noise signal, indicating the identification of the at least one hazard-noise signal.

12. The method of claim 10, wherein the another sensor comprises at least one of:

a light detection and ranging (LiDAR) sensor;

radar sensor; and visual sensor.

13. The method of claim 10, further comprising:

when the location of the source of the hazard noise closes on the location of the vehicle, initiating a handover sequence from the autonomous vehicle operation to a manual vehicle operation.

14. The method of claim 10; further comprising:

generating announcement data corresponding to the hazard-noise signal, the announcement data providing an indication of the identification of the hazard-noise signal to one or more occupants of the vehicle; and performing at least one of the following:

visually announcing the announcement data via a vehicle display; and audibly announcing the announcement data via a vehicle audio device.

15. The method of claim 14, wherein audibly announcing the announcement data via the vehicle audio device comprises:

audibly conveying the exterior hazard-noise signal to the vehicle cabin via the vehicle audio device.

16. The method of claim 10, wherein the hazard noise is a siren.

17. A vehicle control unit comprising:

a wireless communication interface to service communication with a vehicle network;

a processor communicably coupled to the wireless communication interface; and memory communicably coupled to the processor and storing:

an ambient vehicle-noise environment module including instructions that, when executed by the processor, cause the processor to:

monitor, using one or more audible sensors of a vehicle, an environment to identify, using first data acquired by the one or more audible sensors, a hazard-noise signal indicative of a hazard noise being detected in the environment; and upon the identification of the at least one hazard-noise signal, generate a hazard-noise detection signal;

a source location tracking module including instructions that, when executed by the processor, cause the processor to:

responsive to the generation of the hazard-noise detection signal:

determine a first relative location associated with a source of the hazard noise;

determine, using second data acquired subsequent to the first data by at least one of the one or more audible sensors, a second relative location;

sense the location of the source with another sensor to produce additional sensor data;

compare the additional sensor data with the data corresponding to any one of the first relative location and the second relative location of the source;

when the additional sensor data compares favorably with the data, corroborate the first relative location or the second relative location of the source;

in response to the first relative location and second relative location being corroborated, determine, using the first relative location and second relative location, a vector having a magnitude and direction relative to the location of the vehicle; and determine, using the identified vector, whether a location of the source of the hazard noise is in a dynamic closing relation with respect to a location of the vehicle; and generate, based on the dynamic closing relation, closing data operable to indicate the dynamic closing relation;

an announcement module including instructions that, when executed by the processor, cause the processor to:

when the closing data indicates the location of the source closes on the location of the vehicle, perform the following:

generate announcement data relating to the at least one hazard-noise signal; and transmit the announcement data to alert an occupant of the vehicle of the identification of the hazard-noise signal.

18. The vehicle control unit of claim 17, wherein the memory further stores:

a hazard-noise filter module including instructions that, when executed by the processor, cause the processor to:

receive a plurality of received signal data from audible sensor data produced via a pickup pattern of the one or more audible sensors;

filter the plurality of received signal data with a plurality of characteristic filter parameters, each of the plurality of characteristic filter parameters respectively relating to each of the plurality of hazard-noise signals to produce filtered signal data; and when the filtered signal data includes the at least one hazard-noise signal, indicating the identification of the at least one hazard-noise signal.

* * * * *